United States Patent [19]

Cunningham

[11] 3,819,041

[45] June 25, 1974

[54] ROLL OF SEPARABLE PARTITION STRIPS

[75] Inventor: Donald F. Cunningham, Mequon, Wis.

[73] Assignee: Cleveland Partition Corp., Milwaukee, Wis.

[22] Filed: Jan. 26, 1973

[21] Appl. No.: 327,084

Related U.S. Application Data

[62] Division of Ser. No. 45,187, June 10, 1970, abandoned.

[52] U.S. Cl. .............................................. 206/390
[51] Int. Cl. ............................................ B65d 85/67
[58] Field of Search..... 206/58, 56 AB; 229/DIG. 9; 217/32

[56] References Cited
UNITED STATES PATENTS

| 361,603 | 4/1887 | Wheeler | 206/58 |
| 453,003 | 5/1891 | Hicks | 206/58 |
| 2,050,394 | 8/1936 | Straubel | 206/58 X |
| 2,175,670 | 10/1939 | Rutledge | 217/32 |
| 2,968,898 | 1/1961 | Hickin | 53/157 X |
| 3,333,688 | 8/1967 | Green, Jr. | 206/56 AB |
| R9,762 | 6/1881 | Jaeger | 217/32 |

*Primary Examiner*—Leonard Summer

[57] ABSTRACT

This is a novel method of and apparatus for applying protective partitions between advancing glass containers, and the like, as they are moved towards a loading area, as in the disclosed end loading. The method includes providing, as by rerolled rolls of die cut ribbons of longitudinal partition strips, and directing advancing multiple continuous parallel ribbons of disconnectible longitudinal partition strips between advancing massed glass containers, successively placing transverse partition strips across the advancing longitudinal partition strips and between advancing ranks of glass containers which serve as yokes moved by the containers to pull the longitudinal strips, and successively disconnecting the end rank of longitudinal partition strips and packaging the end group of protectively partitioned glass containers in successively provided cartons, or otherwise packaging the same. The apparatus includes a conveyor for advancing glass containers, a rerolled roll of die cut ribbons of longitudinal partition strips, guide corridors and a ramp structure for feeding continuous ribbons of longitudinal partition strips between advancing massed glass containers, mechanism for applying transverse partition strips across the advancing longitudinal partition strips, and mechanism, as a ram, for successively packaging the end group of partitioned containers in cartons. Novel rerolled die cut continuous longitudinal partition strip material and continuous partition assemblies are included.

2 Claims, 5 Drawing Figures

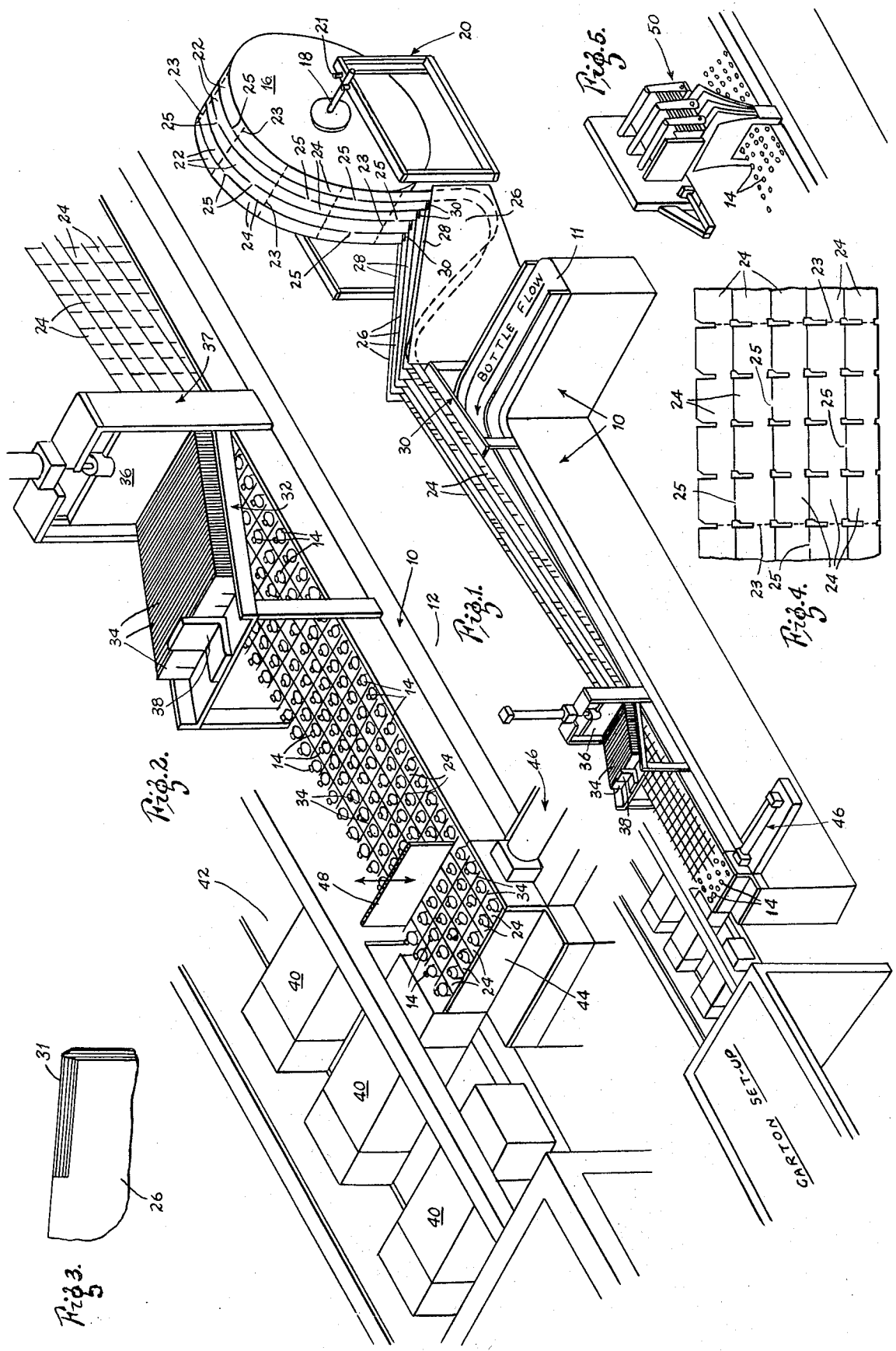

3,819,041

ROLL OF SEPARABLE PARTITION STRIPS

This is a division, of application Ser. No. 45,187 filed June 10, 1970 now abandoned.

BACKGROUND OF THE INVENTION

1. Field of the Invention

The present invention relates generally to the art of protective partitions for glass containers, and the like, and more particularly to a novel method of and apparatus for applying protective partitions between advancing glass containers, and the like, as they are moved towards a loading area in massed ranks for eventual unit loading, and to novel partitioning structure.

2. Description of the Prior Art

The art of providing protective partition assemblies for glass containers, and the like, is an old one. The partition assembly may be disposed about the glass containers before unit loading into a carton, or the partition assembly may be placed in the carton prior to loading of the containers. With end loading of cartons, it is essential, of course, that the partition assembly be about the glass containers at the time the unit is rammed into the carton. Numerous efforts have been made to accomplish disposition of the partition assembly about the glass containers by automatic method and apparatus prior to unit loading, since hand application thereof is expensive in labor and slow in production. In spite of such efforts, there remains a strong need in the industry for a method of and apparatus for accomplishing such application of the partition assembly, which is fast, efficient, accurate, substantially free of stoppages, and readily employed.

SUMMARY OF THE INVENTION

In brief, the present novel apparatus broadly includes a conveyor for advancing glass containers in massed ranks, means for rotatably supporting a rerolled roll of continuous adjacent ribbons of die cut disconnectible longitudinal partition strips, a rerolled roll of such die cut ribbons, corridors for guiding the strips from the roll and turning them 90° into vertical position, a ramp structure on which the strips slide on their bottom edges and by which they are directed into positions between advancing rows of glass containers, structure for feeding transverse partitions strips across and into engagement with the longitudinal strips and between advancing ranks of glass containers which pull the longitudinal strips under movement by the containers, means for grouping a predetermined number of ranks of glass containers in position for unit loading in a carton, means for supplying an open carton in position to receive the unit of glass containers with applied partition assembly, structure for effecting loading on the unit in the readied carton, mechanism for momentarily halting the movement of glass containers and thereby the longitudinal strips to permit unit loading in the carton or mechanism for moving units and cartons in timed relation while unit loading, and relating electrical and mechanical parts. The present novel method includes providing and directing advancing multiple continuous parallel strips of disconnectible longitudinal partition strips between advancing massed ranks of glass containers, successively placing transverse partition strips across the advancing longitudinal partition strips and between advancing ranks of glass containers to pull the longitudinal strips, successively disconnecting the end rank of longitudinal partition strips, and unit loading the end group of protected glass containers in successively provided cartons. Novel rerolled continuous longitudinal partition strip material is included.

Objects of the present invention are to provide a novel method of and apparatus for applying protective partitions between advancing glass containers, and the like, as they are moved toward a loading area for unit loading in cartons, which fulfills the long existing need in the unit loading art; which are fast and economical, which are adapted to serve efficiently and effectively with minimum maintenance over long periods of time; which are adapted to reduce the necessity for skilled labor; which provide ready access for correction of continuous ribbon alignment, and the like; and which otherwise fulfill the objects and advantages sought therefor.

A further object relates to the provision of rerolled die cut ribbon material which can be readily handled with minimum difficulties in its use and by the instant method and apparatus, respectively.

BRIEF DESCRIPTION OF THE DRAWINGS

FIG. 1 is a diagrammatic layout illustrating novel apparatus and roll for carrying out the novel method disclosed;

FIG. 2 is an enlarged fragmentary portion of the layout of FIG. 1;

FIG. 3 is an enlarged fragmentary portion of an inner panel showing the knife-like upper edge portion;

FIG. 4 is an enlarged fragmentary portion of the rerolled roll illustrating details of laterally connecting tabs, perforations, and die cuts;

FIG. 5 is a diagrammatic fragmentary view showing an alternate structure for applying the transverse partitions.

DESCRIPTION OF THE PREFERRED EMBODIMENTS

Referring to the drawings more particularly by reference numerals, with particular reference to FIGS. 1 and 2, an endless conveyor structure 10, including an endless belt 11, is mounted in elevated position upon a support 22. Massed ranks of glass containers 14 are illustrated on the endless belt 11 in FIG. 2, and at the left end thereof in FIG. 1, being omitted on the remaining portion for purposes of clarity of illustration.

A rerolled paperboard roll 16 is rotatably mounted by a shaft 18 on a support 20 between spaced stops 21. The roll 16 illustrated comprises five interrelated continuous ribbons 22 die cut from a wide roll of paperboard and perforated at 23 to provide connected end to end longitudinal partition strips 24 adapted to separate and protect six parallel rows of containers 14 and die cut to receive transverse partitions (FIGS. 1 and 4). Coordinating holding tabs or uncut segments 25 are provided which maintain the strips 24 in aligned relation during rerolling after die cutting and for feeding from the roll 16 (FIG. 4). The tabs 25 are spaced several feet apart along the ribbons 22, and may be offset transversely, if desired, as to assist in ready severance. More or less ribbons 22 may be provided, as required.

Forwardly converging panels 26 define five corridors 28, which accept the ribbons 22 and turn them through 90° for edgewise travel on and down a ramp 30 into separating positions between parallel rows of containers 14. Knife blade edge portions 31 are formed along the top rear edges of the interior panels 26, as shown in FIG. 3, which sever the tabs 25 under the weight of the free loop of paperboard. Separate knives can be attached to the rear portions of the inner panels 26, or elsewhere, if desired. Parallel laterally spaced walls, longitudinally spaced posts, longitudinally extending opposed straps, and the like, may be provided on the ramp 30 to assist in maintaining the ribbons 22 in vertical positions. Conventional power means may be provided to unwind the roll 16 to maintain the slack loops shown to reduce sudden pulls by the roll 16 against unwinding and to insure smooth play out of the ribbons 22.

Supported against the sides of the endless conveyor structure 10 in straddle relation thereto is a sloping rack 32 receiving precut transverse partition strips 34 disposed in contiguous vertical relation, which are biased towards a guillotine type reciprocatable blade 36 by weight 38. The blade 36 is mounted for reciprocating movement on a U-shaped support 37 also secured against the endless conveyor structure 10 in straddle relation. The blade 36 is power actuated to successively drive transverse strips 34 into engagement with the longitudinal partition strips 24 and between ranks of containers 14 in timed relation to the travel of the containers 14, engagement occurring at about the initial point of contact of the ribbons 22 with the conveyor belt 11. No strip 34 is inserted between selected groups of containers 14 at the perforations 23 of the ribbons 22, the power means for the blade 36 being preset to skip same, as is well known in the art.

Cartons 40 open for end loading are brought into container receiving positions by and on a conveyor belt 42. As a batch of 24 containers 14 reaches a stop board 44, a power actuated ram 46 is energized to move the same into the open end of the readied carton 40, which is then conveyor moved along for sealing. The perforations 23 may be broken in the loading action of the ram 46. For cutting some paperboard and for some loadings a vertically reciprocative single blade 48, or multiple blades, is mounted on or above the conveyor structure 10 above the containers 14, or otherwise, and synchronized with the ram 46 or other loading structure provided. The blade 48 is shown diagrammatically for clarity of illustration, but it is to be understood that it may be supported and operated like the guillotine blade 36, or in any other desired manner, of which many ways are well known.

Such blade 48, or blades, may reciprocate vertically from a position below the top of the conveyor structure 10 where the conveyor structure 10 stops short of a position beneath the end unit of containers 14 and partition assembly, a stationary platform being provided for supporting such end unit for subsequent packaging.

The containers 14 effect the longitudinal travel of the ribbons 22. As start up, the ribbons 22 are manually or mechanically pulled forwardly from the roll 16 into position for receiving a transverse partition strip 34. As each transverse partition strip 34 is locked with the longitudinal ribbons 22 by the blade 36, it is engaged by a rank of containers 14. It becomes, in effect, a yoke to pull the ribbons 22 as it is moved forwardly by the containers 14. Thus, the transverse strips 34 between the blade 36 and the ribbons severing knife team up to pull the ribbons 22 and unwind roll 16.

In FIG. 5 is illustrated an alternate structure 50 for receiving and inserting the transverse strips 34 across the ribbons 22. The structure 50 is operated by a vacuum system, air cylinder actuated. Several strips 34, as required, are dropped simultaneously into engagement with the ribbons 22 by gravity, driven by transverse rollers into engagement therewith, or otherwise engaged.

It is clear that there have been provided novel method of and novel means for applying protective partitions between glass containers, and the like, as the containers are being conveyed in massed ranks towards a loading area, and novel longitudinal partition strip structure.

It is to be understood that the foregoing description and the accompanying drawings have been given by way of illustration and example. It is also be be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. In combination, a rerolled roll of ribbons of die cut longitudinal partition strips of paperboard and the like, said ribbons being in adjacent relation, each ribbon comprising a plurality of end to end separably linked longitudinal partition strips, each partition strip being separated from adjacent strips at its ends by readily separable perforations, attaching means between adjacent ribbons at spaced locations along their lengths for maintaining the longitudinally adjacent partition strips in substantially transverse alignment for feeding the partition strips in successive ranks, each partition strip having at least one transversely oriented slit extending from one side edge of and only part way across the strip, the slits of adjacent ribbons being transversely aligned for feeding the partition strips in successive ranks with their slits in alignment.

2. The rerolled roll of claim 1 in which said attaching means are separable tabs.

* * * * *